UNITED STATES PATENT OFFICE.

OTTO STACHLIN AND KARL ZECHENTMAYER, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

COLOR-LAKES AND PROCESS OF MAKING SAME.

1,031,823. Specification of Letters Patent. Patented July 9, 1912.

No Drawing. Application filed July 25, 1910. Serial No. 573,707.

*To all whom it may concern:*

Be it known that we, OTTO STACHLIN, Ph. D., chemist, and KARL ZECHENTMAYER, Ph. D., chemist, citizens of the Empire of Germany, residing at Höchst-on-the-Main, Germany, have invented certain new and useful Improvements in Color-Lakes and Processes of Making Same, of which the following is a specification.

We have found that by treating with ferric salts the sulfonic acids of the 1.2-naphthylenediamin, green coloring matters are obtained which, when precipitated by methods well known in the preparation of this class of colors, for instance with the aid of alkaline-earth salts or aluminum-salts, yield valuable color-lakes. These lakes are suitable for coloring wall-paper and other stained paper and can also be used as printing-painting and lime-colors. They are distinguished by their bright greenish-blue tint, their great fastness to water, acids, alkalis, alcohol, lime and oil, and chiefly by their excellent fastness to light.

The following are examples of how the said color-lakes can be prepared:

Example I: There are mixed: 5 kg. of sulfate of aluminum 18%, dissolved in 50 liters of water; 30 kg. of sulfate of baryta (heavy spar); 2 kg. of calcined soda, dissolved in 20 liters of water; 3 kg. of the ferric compound of 1.2-naphthylenediamin 5- or 3 sulfonic acid, dissolved in 300 liters of water; 9 kg. of crystallized barium chlorid, dissolved in 90 liters of water. The color lake thus produced is pressed off and used either in this state as a paste, or after it has been dried.

Example II: There are consecutively mixed: 10 kgr. of sulfate of aluminum 18%, dissolved in 100 liters of water; 5 kgr. of calcined soda, dissolved in 50 liters of water; 10 kgr. of sulfate of baryta (heavy spar); 3 kg. of the ferric compound of 1.2-naphthylenediamin 5- or 3 sulfonic acid, dissolved in 250 liters of water; 18 kgr. of crystallized barium chlorid, dissolved in 180 liters of water. The color-lake thus produced is filtered off and used either in this state as a paste, or after it has been dried.

Having now described our invention, what we claim is:

1. As new products, color-lakes comprising those salts of the ferric compounds of 1.2-naphthylenediamin-sulfonic acids which are insoluble in water, said color-lakes being bluish-green powders of a bright tint, insoluble in oil and alcohol and fast to acids, alkalis, lime and light.

2. As a new product, the color-lake being an aluminum-salt of the ferric compound of 1.2-naphthylenediamin-5-sulfonic acid, said lake being a bluish-green powder of a bright tint, insoluble in water, oil and alcohol and fast to acids, alkalis, lime and light.

In testimony whereof, we affix our signatures in presence of two witnesses.

OTTO STACHLIN.
KARL ZECHENTMAYER.

Witnesses:
JEAN GRUND,
CARL GRUND.